(12) United States Patent
Lu et al.

(10) Patent No.: US 10,607,255 B1
(45) Date of Patent: Mar. 31, 2020

(54) PRODUCT DETAIL PAGE ADVERTISING

(71) Applicant: Amazon Technologies, Inc., Reno, NV (US)

(72) Inventors: James Fubin Lu, Seattle, WA (US); Taylor Christian Deehan, New York, NY (US); Sean Curtis, Rockville Centre, NY (US); Jason Adrian Galep, Seattle, WA (US); Jason Kita Choi, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 545 days.

(21) Appl. No.: 14/109,273

(22) Filed: Dec. 17, 2013

(51) Int. Cl.
G06Q 30/02 (2012.01)
(52) U.S. Cl.
CPC ..... *G06Q 30/0251* (2013.01); *G06Q 30/0222* (2013.01); *G06Q 30/0239* (2013.01); *G06Q 30/0243* (2013.01); *G06Q 30/0253* (2013.01)
(58) Field of Classification Search
CPC ........................................ G06Q 30/0207–0277
See application file for complete search history.

(56) References Cited

U.S. PATENT DOCUMENTS

| 7,813,965 | B1 | 10/2010 | Robinson | |
|---|---|---|---|---|
| 8,473,349 | B1* | 6/2013 | Manber | G06Q 30/02 705/14.48 |
| 8,504,486 | B1 | 8/2013 | Pinto | |
| 8,600,796 | B1 | 12/2013 | Sterne | |
| 2004/0267611 | A1* | 12/2004 | Hoerenz | G06Q 10/0637 705/14.13 |
| 2006/0074747 | A1 | 4/2006 | Kline | |
| 2006/0253327 | A1* | 11/2006 | Morris | G06Q 30/02 705/14.42 |
| 2007/0027757 | A1* | 2/2007 | Collins | G06F 17/2785 705/14.49 |
| 2007/0033103 | A1* | 2/2007 | Collins | G06F 17/2785 705/14.41 |
| 2007/0078707 | A1* | 4/2007 | Axe | G06Q 30/02 705/14.41 |
| 2008/0154684 | A1* | 6/2008 | Kniaz | G06Q 30/02 705/7.29 |
| 2009/0281870 | A1 | 11/2009 | Sun | |
| 2009/0282019 | A1 | 11/2009 | Galitsky | |
| 2010/0005001 | A1 | 1/2010 | Aizen | |
| 2010/0211460 | A1* | 8/2010 | Agarwal | G06Q 30/02 705/14.46 |

(Continued)

OTHER PUBLICATIONS

"How to Write Advertisements That Sell", by System, The Magazine of Business, Copyright 1912, by A.W. Shaw Company (book images scanned by Examiner).*

*Primary Examiner* — David J Stoltenberg
(74) *Attorney, Agent, or Firm* — Eversheds Sutherland (US) LLP

(57) ABSTRACT

Systems, methods, and computer-readable media are disclosed for generating an online advertising campaign based on one or more advertising campaign parameters and selecting an advertisement of the advertising campaign for presentation in an available advertising slot. The advertising campaign parameter(s) may include one or more product identifiers. Advertisements of the advertising campaign may be presented in advertising slots available on network resources such as product detail pages associated with the product identifiers.

18 Claims, 6 Drawing Sheets

(56) References Cited

U.S. PATENT DOCUMENTS

| | | | |
|---|---|---|---|
| 2010/0268609 A1* | 10/2010 | Nolet | G06Q 30/0251 705/14.71 |
| 2011/0035272 A1* | 2/2011 | Bhatt | G06Q 30/02 705/14.42 |
| 2011/0055017 A1* | 3/2011 | Solomon | G06Q 30/02 705/14.66 |
| 2011/0066497 A1* | 3/2011 | Gopinath | G06Q 30/02 705/14.53 |
| 2011/0071899 A1 | 3/2011 | Robertson | |
| 2011/0202400 A1 | 8/2011 | Bedard | |
| 2011/0202404 A1 | 8/2011 | van der Riet | |
| 2012/0010998 A1* | 1/2012 | Spreen | G06Q 30/02 705/14.54 |
| 2012/0036482 A1 | 2/2012 | Haynes | |
| 2012/0095828 A1* | 4/2012 | Evankovich | G06Q 10/00 705/14.49 |
| 2012/0123856 A1* | 5/2012 | Paunikar | G06Q 30/02 705/14.48 |
| 2012/0150626 A1* | 6/2012 | Zhang | G06Q 30/0241 705/14.42 |
| 2012/0179534 A1 | 7/2012 | Moukas | |
| 2012/0197750 A1 | 8/2012 | Batra | |
| 2012/0254060 A1 | 10/2012 | Choudhary | |
| 2013/0151332 A1* | 6/2013 | Yan | G06Q 30/0243 705/14.42 |
| 2014/0012659 A1* | 1/2014 | Yan | G06Q 30/0241 705/14.42 |
| 2014/0058831 A1* | 2/2014 | Duva | G06Q 30/0246 705/14.45 |
| 2015/0066628 A1* | 3/2015 | Ghosh | G06Q 30/02 705/14.43 |
| 2015/0066630 A1* | 3/2015 | Ge | G06Q 30/0255 705/14.43 |
| 2015/0248698 A1* | 9/2015 | Bhattacharjee | G06F 16/9535 705/14.54 |
| 2016/0307229 A1* | 10/2016 | Balasubramanian | G06Q 30/0243 |
| 2018/0158094 A1* | 6/2018 | Chitilian | G06F 9/542 |
| 2018/0218394 A1* | 8/2018 | Kerns | G06Q 30/0251 |

\* cited by examiner

PRODUCT DETAIL PAGE ADVERTISING

BACKGROUND

Two major types of online advertising are display advertising and search advertising. Display advertising involves the presentation of online advertisements in advertising slots available on web pages. One form of display advertising is banner advertising in which a banner advertisement is served by an ad server for presentation in an available ad slot. In the case of search advertising, advertisers may bid on particular search words or phrases. An advertisement may then be presented to a user who enters a search string that contains a matching word or phrase.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
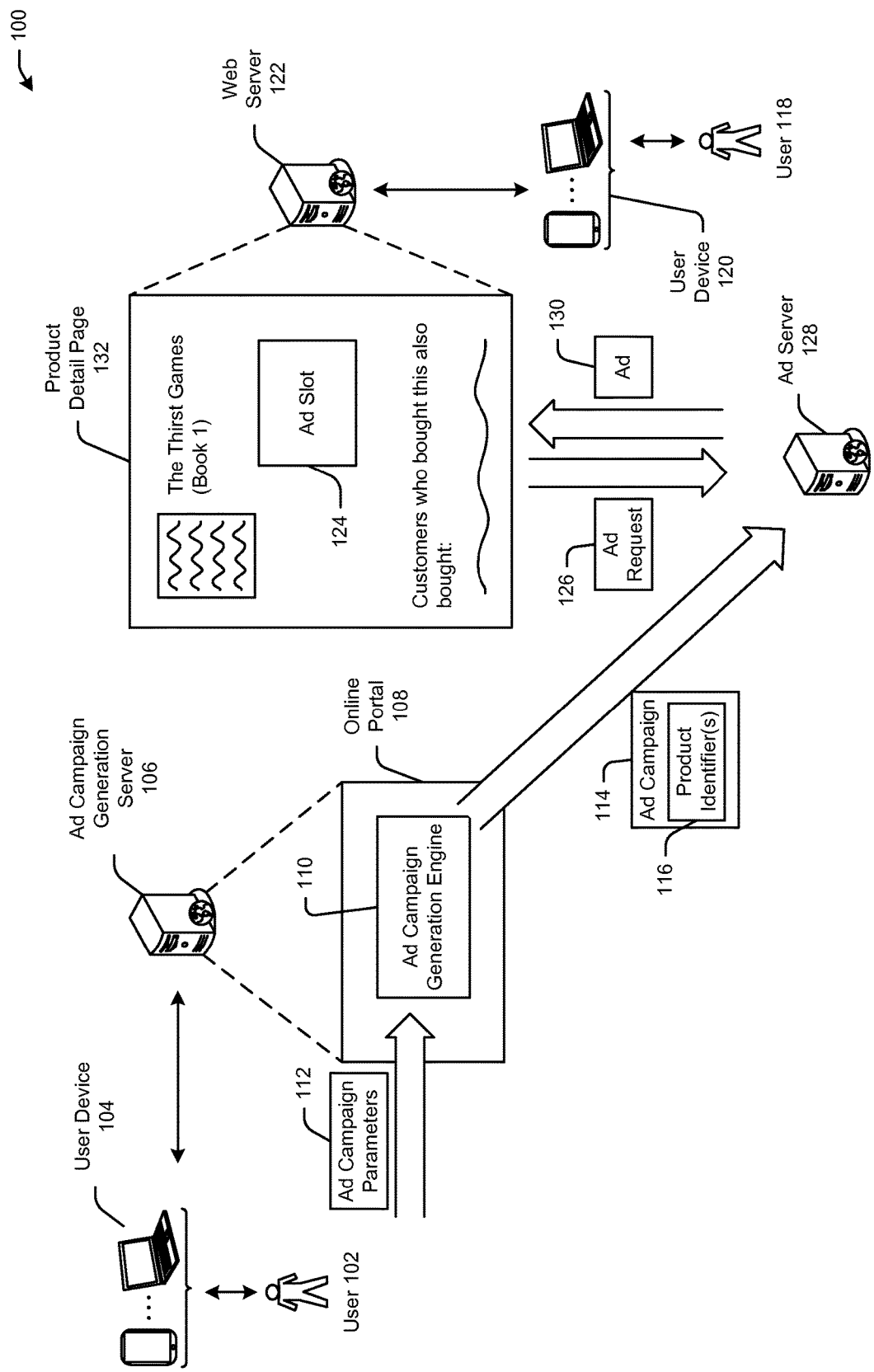
FIG. 1 is a schematic diagram of an illustrative use case that involves generating an advertising campaign based on advertising campaign parameters and presenting an advertisement forming part of the advertising campaign in an available advertising slot in accordance with one or more example embodiments of the disclosure.

This disclosure relates to, among other things, systems, methods, computer-readable media, techniques, and methodologies for generating an advertising campaign based on advertising campaign parameters and presenting an advertisement associated with the advertising campaign in an available advertising slot in accordance with one or more example embodiments of the disclosure. For ease of explanation, the terms "advertising" and "advertisement" may be referred to at times by the shortened form "ad."

The ad campaign parameters based on which an ad campaign may be generated may include user-specified parameters and/or auto-generated parameters. For example, a user acting on behalf of an advertiser may access an online interface (e.g., an online portal such as a web portal) via which the user may specify one or more ad campaign parameters. The ad campaign parameters may include, for example, one or more product identifiers that identify particular products. Optionally, the ad campaign parameters may be auto-generated based on, or in lieu of, user-specified ad campaign parameters. For example, product identifiers that identify products that are related to products associated with user-specified product identifiers may be identified and recommended to the user. The user may be provided with a capability to select one or more of the recommended product identifiers as ad campaign parameters for a desired ad campaign.

The products may include any suitable product including, but not limited to, physical products, consumable content stored in storage media, electronically deliverable content, and so forth. The ad campaign parameters may additionally or alternatively include parameters that specify a maximum bid amount to submit for available advertising inventory; a total budget for the ad campaign; a total number of impressions to be served as part of the ad campaign; information for use in generating ad creatives such as, for example, graphics, text, logos, etc.; an amount of revenue to be shared for desired user conversion events; a revenue sharing model in accordance with which revenue is to be shared (e.g., a cost-per-click model, a cost-per-impression model, a cost-per-purchase model, etc.); and so forth.

Product detail pages may be provided for products identified by product identifiers. A product detail page may include any of a variety of information for a product such as pricing information, availability, customer reviews, a description of the product (e.g., specifications, operative capabilities, etc.), and so forth. A product identifier specified as an ad campaign parameter for an ad campaign may be used to identify a particular product, and thus, a particular product detail page relating to the product. Advertisements forming part of the ad campaign may then be served in an ad slot available on the product detail page. Although illustrative embodiments may be described herein in the context of product detail pages, it should be appreciated that such embodiments are also applicable to any suitable network resource (e.g., any suitable web resource).

More specifically, upon receiving a request for an advertisement for presentation in an ad slot available on a product detail page, each matching ad campaign associated with a product identifier that matches a product identifier associated with the product detail page may be identified. Respective selection parameter(s) associated with each ad campaign may then be assessed to identify a particular matching ad campaign from which to select an advertisement for presentation in the available ad slot.

The selection parameters may include any of a variety of parameters including, but not limited to, a maximum bid amount specified as an ad campaign parameter, one or more metrics indicative of historical performance of the ad campaign (e.g., a conversion metric indicative of a number or percentage of ad impressions associated with the ad campaign that have resulted in a desired user conversion event), a frequency metric indicative of a number of ad impressions associated with the ad campaign that have been presented to a particular user, a relatedness metric indicative of an extent to which a product advertised by the ad campaign and a product associated with a page on which the ad slot is available are related, and so forth. One or more selection algorithms may be executed to compare the selection parameters associated with any given ad campaign to corresponding thresholds and/or to selection parameters associated with one or more other ad campaigns in order to identify a particular ad campaign from which to select an advertisement for presentation in the ad slot available on the product detail page.

Data indicative of the performance of an ad campaign may be tracked and collected. The ad campaign performance data may include data relating to one or more performance metrics associated with the ad campaign such as, for example, a number or percentage of ad impressions presented on a product detail page that have generated a desired user conversion event (e.g., an ad click, subsequent related searching or browsing activity, subsequent product detail page views for related products, etc.). A representation (e.g., textual, graphical, etc.) of the ad campaign performance data may be generated and transmitted for presentation to a user acting on behalf of an advertiser associated with the ad campaign. Based on the ad campaign performance data, the user acting on behalf of the advertiser may desire to modify one or more ad campaign parameters.

For example, the ad campaign performance data may indicate poor performance of the ad campaign in connection with a particular product. In an example embodiment, poor performance may be indicated by a failure of the ad impressions presented on a product detail page to generate a threshold number or percentage of desired user conversion events. A user may be provided with the capability to modify ad campaign parameters in an attempt to improve the performance of the ad campaign. For example, the user may access the online interface described earlier to disassociate the product identifier associated with the poorly performing product from the ad campaign and associate one or more other product identifiers with the ad campaign. In certain example embodiments, the newly specified product identifiers may be identified based on common attributes shared by products identified by such product identifiers and products that the ad campaign performance data indicates are performing well. In other example embodiments, one or more algorithms may be executed to analyze the ad campaign performance data and provide recommendations to the user for product identifiers to associate with the ad campaign that may improve the performance of the ad campaign.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. For example, although embodiments of the disclosure may be described herein in the context of ad impressions served on product detail pages, it should be appreciated that ad impressions served in ad slots available on any suitable network resource (e.g., user interfaces of a dedicated mobile application or the like) are also within the scope of this disclosure. Similarly, while embodiments of the disclosure may be described herein in the context of ad campaign parameters that include product identifiers, it should be appreciated that additional or alternative ad campaign parameters may be utilized. The above-described embodiments and additional and/or alternative embodiments of the disclosure will be described in detail hereinafter through reference to the accompanying drawings.

Illustrative Use Cases and System Architecture

FIG. 1 is a schematic diagram of an illustrative use case that involves generating an advertising campaign based on advertising campaign parameters and presenting an advertisement forming part of the advertising campaign in an available advertising slot in accordance with one or more example embodiments of the disclosure.

Referring to FIG. 1, a user 102 is illustratively depicted. The user 102 may be, for example, an advertiser or an individual or other entity acting on behalf of an advertiser. The user 102 may utilize a user device 104 to access an online interface hosted by an ad campaign generation server 106. The user device 104 may include any suitable user computing device including, but not limited to, a smartphone or other cellular device, a tablet device, an electronic reader device, a desktop computing device, a laptop computing device, a gaming console, a multimedia content streaming device, a television such as Smart TV, or any other device capable of accessing, receiving, and/or displaying content received over one or more networks.

The user device 104 may be configured to request and receive content over one or more networks. For example, the user device 104 may be configured to access an online portal 108 hosted by the ad campaign generation server 106 and exchange data with the ad campaign generation server 106 via the online portal 108. Data (e.g., content) received from the ad campaign generation server 106 via the online portal 108 may be rendered by one or more applications executing on the user device 104 such as a traditional or mobile browser application, a dedicated smartphone or tablet application, or the like.

The ad campaign generation server 106 may include any suitable combination of hardware, software, and/or firmware configured to, among other things, host the online portal 108 and exchange data with the user device 104 via the online portal 108. For example, the ad campaign generation server 106 may be configured to receive input from the user device 104 on behalf of the user 102 and generate an ad campaign 114 based on the received input. Although a single ad campaign generation server 106 is depicted and described with respect to FIG. 1, it should be appreciated that multiple ad campaign generation servers 106 may be provided and may be configured to perform functionality described herein in a distributed manner.

In example embodiments, the user 102 may access the online portal 108 using the user device 104 and provide input indicative of a product for which an advertiser wishes to generate the ad campaign 114. For example, the user 102 may select a product identifier associated with a product sought to be advertised from a set of candidate product identifiers. It should be appreciated that the user 102 may select multiple product identifiers associated with multiple products sought to be advertised such as, for example, as part of a brand awareness campaign.

Upon specifying a product to which the ad campaign 114 is directed, the user 102 may further specify various ad campaign parameters 112 for the ad campaign 114. As previously described, the user-specified ad campaign parameters 112 may include, for example, one or more product identifiers 116 that identify particular products in connection with which ad impressions of the ad campaign will be presented. The user 102 may select the product identifiers 116 from a set of candidate product identifiers in a manner similar to selection of the product identifier for the product to be advertised.

The ad campaign parameters 112 may additionally or alternatively include parameters that specify a maximum bid amount to submit for available advertising inventory; a total budget for the ad campaign; a total number of impressions to be served as part of the ad campaign; information for use in generating ad creatives such as, for example, graphics, text, logos, etc.; an amount of revenue to be shared for desired user conversion events; a revenue sharing model in accordance with which revenue is to be shared; and so forth.

In addition, as previously described, certain ad campaign parameters 112 may be auto-generated based on, or in lieu of, user-specified ad campaign parameters. For example, product identifiers that identify products that are related to products associated with user-specified product identifiers may be identified and automatically associated with the ad campaign 114 or recommended to the user 102 for association with the ad campaign 114. In certain example embodiments, a product may be determined to be related to another product if the two products share one or more common attributes. For example, in the case of consumable content products, the products may be determined to be related if they are classified according to a same subject matter category or genre.

An ad campaign generation engine 110 may be provided that receives, via the online portal 108, an indication of the one or more ad campaign parameters 112 specified by the user 102. Further, as described earlier, in certain example embodiments, the ad campaign generation engine 110 may generate one or more of the ad campaign parameters 112, potentially based on one or more user-specified ad campaign parameters 112.

In connection with receiving and/or generating the ad campaign parameters 112, one or more ad creatives may be generated as well. In certain example embodiments, the user 102 may be provided with a capability to customize the ad creatives generated for the ad campaign 114. For example, the user 102 may be provided with a capability to upload various textual content, graphical content, audio content, video content, and so forth to the ad campaign generation server 106 via the online portal 108. The user 102 may be further provided with a capability to select font type, font size, font color, placement of content within the creative, creative size, and so forth. The ad campaign generation engine 110 may be configured to receive the content provided by the user 102 and generate one or more ad creatives based thereon.

In other example embodiments, the ad campaign generation engine 110 may retrieve content for the ad creatives from one or more existing data sources. For example, the content may have been previously provided in connection with a previous ad campaign, and the ad campaign generation engine 110 may identify and retrieve such content for use in connection with the ad campaign 114.

In still other embodiments, the content utilized for generating an ad creative may be independently determined by the ad campaign generation engine 110, and may be relatively standardized, thereby minimizing the burden on the user 102 to specify content for the ad creatives, and minimizing any review time that may be necessary to ensure that an ad creative generated based on user-specified content conforms to the applicable criteria for presentation.

The ad campaign generation engine 110 may be configured to generate the ad campaign 114 for a product based at least in part on the ad campaign parameters 112 (which may include one or more product identifiers 116 associated with products having product detail pages on which advertisements directed to the advertised product will be presented) and the ad creatives. As part of a process for generating the ad campaign 114, the ad campaign generation engine 110 may be configured to store ad campaign data indicating an association between the ad campaign parameters 112 and the ad creatives forming part of the ad campaign 114. The ad campaign generation engine 110 (or the ad campaign generation server 106 more generally) may be configured to transmit the ad campaign data to an ad server 128. As will be described in more detail hereinafter, the ad server 128 may analyze the ad campaign data to determine an advertisement to select for presentation in an ad slot available on, for example, a product detail page. It should be appreciated that the ad server 128 may receive respective ad campaign data associated with multiple ad campaigns, each of which may be associated with a respective one or more product identifiers indicative of products associated with product detail pages on which ad impressions associated with the ad campaign are to be presented.

In an illustrative and non-limiting example, the product sought to be advertised as part of the ad campaign 114 may be consumable content such as a fantasy novel. Product identifiers 116 specified as ad campaign parameters 112 for the ad campaign 114 may be associated with other consumable content (e.g., other fantasy novels) classified according to the same genre. In other example embodiments, the product identifiers 116 may be associated with related products such as fantasy video games, fantasy board games, etc.

A web server 122 may be provided that hosts a product detail page 132. The product detail page 132 may be associated with a particular product such as the illustrative fantasy novel "The Thirst Games" depicted in FIG. 1. The product detail page 132 may include an ad slot 124 that is configured to receive an advertisement. A user 118 may utilize a user device 120 to access the product detail page 132 hosted by the web server 122. More specifically, the user device 120 may transmit a request (e.g., a Hypertext Transfer Protocol (HTTP) request) to the web server 122 for content associated with the product detail page 132. Responsive to receiving the request, the web server 122 may transmit the content of the product detail page 132 to the user device 120 for rendering by an application executing on the user device 120 such as, for example, a browser application or a dedicated mobile application.

The content received from the web server 122 may include a location identifier (e.g., a uniform resource locator (URL)) that identifies the ad server 128. The rendering application executing on the user device 120 may then submit an ad request 126 to the ad server 128 for an advertisement to be presented in the ad slot 124. Alternatively, the web server 122 may submit the ad request 126 for the advertisement to the ad server 128.

The ad server 128 may include any suitable combination of hardware, software, and/or firmware that supports functionality for identifying an ad campaign from which to select an advertisement for presentation in an available ad slot (e.g., the ad slot 124 available on the product detail page 132). Still referring to the ongoing illustrative example, upon receiving the ad request 126, the ad server 128 may analyze stored ad campaign data to identify each ad campaign that is associated with a product identifier that matches a product identifier associated with "The Thirst Games" fantasy novel. Such ad campaign(s) may be referred to herein as matching ad campaign(s).

The ad server 128 may then assess respective selection parameter(s) associated with each such matching ad campaign to identify a matching ad campaign that satisfies appropriate selection criteria. As previously noted, the selection parameters may include, for example, a maximum bid amount, one or more metrics indicative of historical performance of the ad campaign (e.g., a conversion metric indicative of a number or percentage of ad impressions associated with the ad campaign that have resulted in a desired user conversion event), a frequency metric indicative of a number of ad impressions associated with the ad campaign that have been presented to a particular user (e.g., the user 118), a relatedness metric indicative of an extent to which a product advertised by the ad campaign and a product associated with a page on which the ad slot is available are related, and so forth.

The ad server 128 may execute one or more selection algorithms to compare the selection parameters associated with any given matching ad campaign to corresponding thresholds and/or to selection parameters associated with one or more other ad campaigns in order to identify a particular matching ad campaign from which to select an advertisement for presentation in the ad slot 124 available on the product detail page 132. For example, in certain example embodiments, the ad server 128 may select an ad campaign that is associated with the highest maximum bid amount. In other example embodiments, the ad server 128 may select an ad campaign having the highest number or percentage of ad impressions that have generated desired user conversion events. The ad impressions that may be analyzed may include only those ad impressions presented on the product detail page 132 or all ad impressions presented as part of an ad campaign generally.

It should be appreciated that in various example embodiments, analysis of a particular type of selection parameter may cause an ad campaign to be excluded from consideration but may not necessarily identify an ad campaign that should be selected. For example, the ad server 128 may determine that a number of ad impressions served to the user 118 for a particular ad campaign meets or exceeds a corresponding threshold. In such a scenario, that ad campaign may be excluded from consideration. However, other selection parameters (e.g., historical performance metrics) may need to be analyzed to identify an ad campaign from which to select an advertisement for presentation in the ad slot 124.

Upon identifying an appropriate matching ad campaign, the ad server 128 may select a particular advertisement 130 associated with the ad campaign. The ad server 128 may then transmit the ad 130 to the rendering application executing on the user device 120 for presentation in the ad slot 124. In other example embodiments, the ad server 128 may transmit the ad 130 to the web server 122 which may, in turn, transmit the ad 130 to the user device 120 for presentation in the ad slot 124.

The ad server 128 may be further configured to track and collect data indicative of the performance of an ad campaign (e.g., the ad campaign 114). The ad campaign performance data may include data relating to one or more performance metrics associated with the ad campaign 114 such as, for example, a number or percentage of ad impressions presented on each product detail page that have generated a desired user conversion event (e.g., an ad click, subsequent related searching or browsing activity, subsequent product detail page views for related products, etc.). A representation of the ad campaign performance data may be generated and transmitted for presentation to the user 102. Based on the historical performance data, the user 102 may desire to modify one or more of the ad campaign parameters 112.

For example, the ad campaign performance data may indicate poor performance of the ad campaign in connection with a particular product or product detail page (e.g., the product detail page 132). In an example embodiment, poor performance may be indicated by a failure of the ad impressions presented on the product detail page 132 to generate a threshold number or percentage of desired user conversion events. In such an example embodiment, the user 102 may access the online portal 108 to disassociate the product identifier associated with the poorly performing product detail page 132 and associate one or more other product identifiers with the ad campaign 114. In certain example embodiments, the newly specified product identifiers may be identified by the user 102 or may be independently identified by the ad campaign generation engine 110 based on common attributes shared by products identified by such product identifiers and products that the ad campaign performance data indicates are performing well.

It should be appreciated that the web server 122 and the ad server 128 may include any suitable computing device including, but not limited to, a server computer, a mainframe computer, a workstation, a desktop computer, a laptop computer, and so forth. It should further be appreciated that the user device 120 may include any suitable user device including any of the types of devices described in connection with the user device 104.

Figure 2:
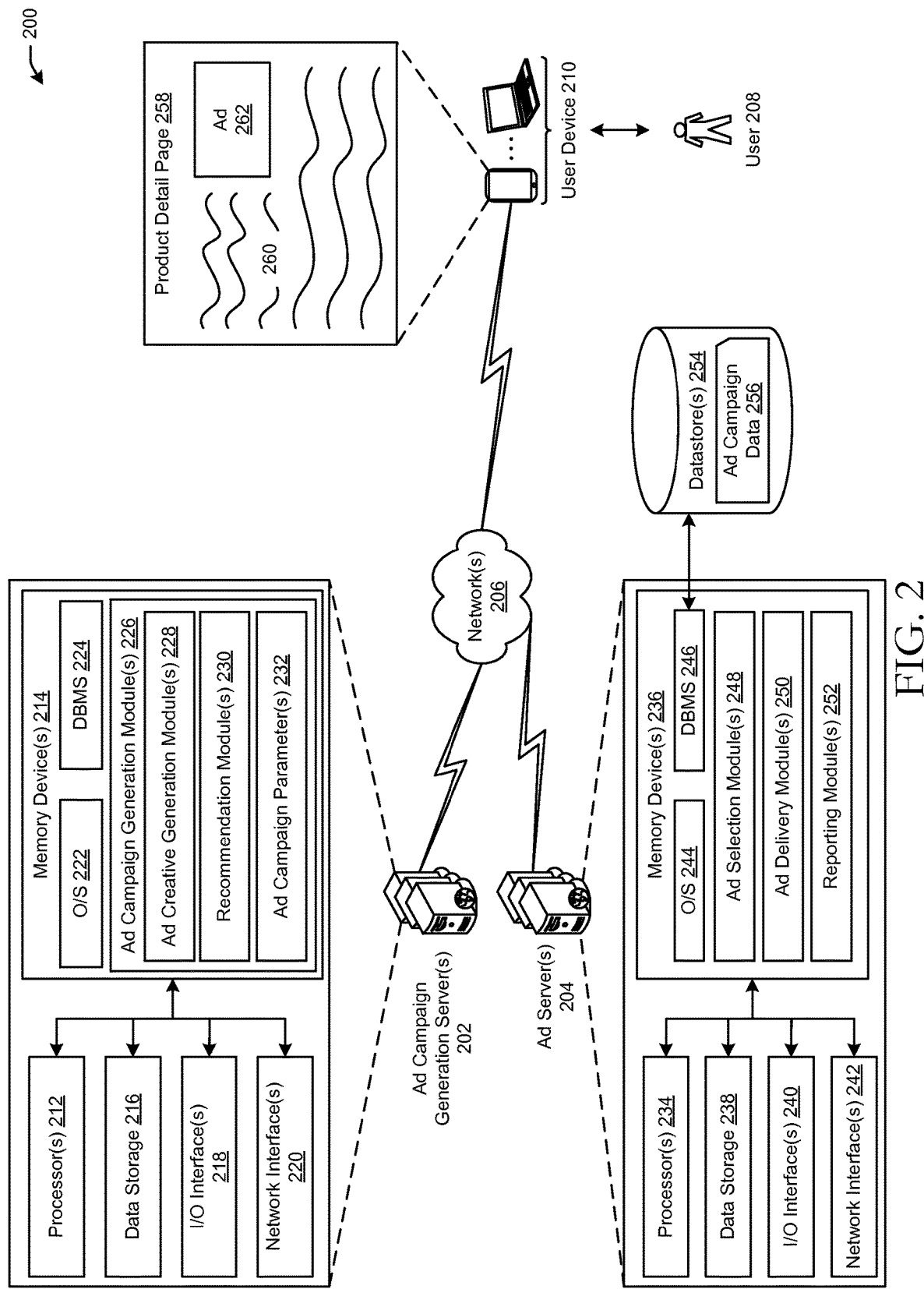
FIG. 2 is a schematic block diagram of an illustrative system architecture that, among other things, enables generating an advertising campaign based on advertising campaign parameters and presenting an advertisement forming part of the advertising campaign in an available advertising slot in accordance with one or more example embodiments of the disclosure.

FIG. 2 is a schematic block diagram of an illustrative system architecture 200 that, among other things, enables generating an advertising campaign based on advertising campaign parameters and presenting an advertisement forming part of the advertising campaign in an available advertising slot in accordance with one or more example embodiments of the disclosure.

The illustrative system architecture 200 may include one or more ad campaign generation servers 202, one or more ad servers 204, and one or more user devices 210 that may be configured to communicate with one another via one or more networks 206. Although not depicted in FIG. 2, the system architecture 200 may further include one or more web servers that host content such as content associated with product detail pages.

The user device(s) 210 may be operable by one or more users 208. The user device(s) 210 may include the user device 120 and/or the user device 104 of FIG. 1. Further, the ad campaign generation server(s) 202 may include the ad campaign generation server 106 and the ad server(s) 204 may include the ad server 128. While various illustrative components of the system architecture 200 may be described herein in the singular, it should be appreciated that multiple ones of any such components may be provided in various example embodiments of the disclosure.

The network(s) 206 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the network(s) 206 may have any suitable communication range associated therewith and may include, for example, global networks (e.g., the Internet), metropolitan area networks (MANs), wide area networks (WANs), local area networks (LANs), or personal area networks (PANs). In addition, the network(s) 206 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

In an illustrative configuration, the ad campaign generation server 202 may include one or more processors (processor(s)) 212, one or more memory devices 214 (generically referred to herein as memory 214), additional data storage 216, one or more input/output ("I/O") interface(s) 218, and/or one or more network interface(s) 220. These various components will be described in more detail hereinafter.

The memory 214 of the ad campaign generation server 202 may include volatile memory (memory that maintains its state when supplied with power) such as random access memory (RAM) and/or non-volatile memory (memory that maintains its state even when not supplied with power) such as read-only memory (ROM), flash memory, and so forth. In various implementations, the memory 214 may include multiple different types of memory, such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 214 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The memory 214 may store computer-executable instructions that are loadable and executable by the processor(s) 212, as well as data manipulated and/or generated by the processor(s) 212 during the execution of the computer-executable instructions. For example, the memory 214 may store one or more operating systems (O/S) 222; one or more database management systems (DBMS) 224; one or more program modules, applications, or the like such as, for example, one or more ad campaign generation modules 226, one or more ad creative generation module(s) 228, and one or more recommendation module(s) 230; and data such as, for example, one or more ad campaign parameters 232. In certain example embodiments, the ad creative generation module(s) 228 and the recommendation module(s) 230 may be provided as sub-modules of the ad campaign generation module(s) 226. Further, the ad campaign generation engine 110 depicted in FIG. 1 may include one or more of the illustrative program modules depicted as being loaded into the memory 214.

It should be appreciated that the program modules depicted in FIG. 2 as being loaded into the memory 214 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the ad campaign generation server 202 and/or hosted on remote computing device(s) accessible via one or more of the network(s) 206 may be provided to support functionality provided by the program modules depicted in FIG. 2 and/or additional or alternate functionality. Further, functionality may be modularized differently such that processing described as being supported collectively by the collection of program modules depicted in FIG. 2 may be performed by a fewer or greater number of modules, or functionality described as being supported by any particular module may be supported, at least in part, by another module. In addition, program modules that support the functionality described herein may form part of one or more applications executable across any number of systems or devices of the system architecture 200 in accordance with any suitable computing model such as, for example, a client-server model, a peer-to-peer model, and so forth.

The ad campaign generation module(s) 226 may include computer-executable instructions that responsive to execution by one or more of the processor(s) 212 may cause operations to be performed for generating an ad campaign based at least in part on the ad campaign parameter(s) 232 and ad creative(s) generated responsive to execution of computer-executable instructions provided as part of the ad creative generation module(s) 228. The recommendation module(s) 230 may include computer-executable instructions that responsive to execution may cause operations to be performed for identifying and recommending ad campaign parameters for association with an ad campaign. For example, the recommendation module(s) 230 may support functionality for identifying products that are related to products identified by user-specified product identifiers and may provide a user with a recommendation to associate product identifiers associated with such products with an ad campaign that is being generated. In certain example embodiments, a product may be determined to be related to another product if the two products share one or more common attributes. For example, in the case of consumable content products, the products may be determined to be related if they are classified according to a same subject matter category or genre. Functionality supported by the various program modules of the ad campaign generation server 202 will be described in more detail with reference to FIGS. 3-6.

The various illustrative program modules depicted as being loaded into the memory 214 may include computer-executable instructions that in response to execution by the processor(s) 212 cause various processing to be performed. In order to perform such processing, the program modules may utilize various data/information stored in the memory 214, in the data storage 216, and/or in one or more external datastores (not shown). Further, while not depicted in FIG. 2, any of the data stored in external datastore(s) or in the data storage 216 may be loaded into the memory 214 as well.

Referring now to other illustrative components of the ad campaign generation server 202, the O/S 222 loaded into the memory 214 may provide an interface between other application software executing on the ad campaign generation server 202 and the hardware resources of the ad campaign generation server 202. More specifically, the O/S 222 may include a set of computer-executable instructions for managing hardware resources of the ad campaign generation server 202 and for providing common services to other application programs (e.g., managing memory allocation among various application programs). The O/S 222 may include any operating system now known or which may be developed in the future including, but not limited to, any server operating system, any mainframe operating system, or any other proprietary or non-proprietary operating system.

As previously noted, the ad campaign generation server 202 may further include data storage 216 such as removable storage and/or non-removable storage including, but not limited to, magnetic storage, optical disk storage, and/or tape storage. The data storage 216 may provide non-transient storage of computer-executable instructions and other data. The data storage 216 may include storage that is internal and/or external to the ad server 204. The memory 214 and/or the data storage 216, removable and/or non-removable, are examples of computer-readable storage media (CRSM) as that term is used herein.

The DBMS 224 depicted as being loaded into the memory 214 may support functionality for accessing, retrieving, storing, and/or manipulating data stored in external datastore(s), data stored in the memory 214, and/or data stored in the data storage 216. The DBMS 224 may use any of a variety of database models (e.g., relational model, object model, etc.) and may support any of a variety of query languages. It should be appreciated that any data and/or computer-executable instructions stored in the memory 214, including any of the program modules, the O/S 222, and the DBMS 224, may be additionally, or alternatively, stored in the data storage 216 and/or in external datastore(s) and loaded into the memory 214 therefrom.

The processor(s) 212 may be configured to access the memory 214 and execute computer-executable instructions stored therein. For example, the processor(s) 212 may be configured to execute computer-executable instructions of the various program modules of the ad campaign generation server 202 to cause or facilitate various operations to be performed in accordance with one or more embodiments of the disclosure. The processor(s) 212 may include any suitable processing unit capable of accepting digital data as input, processing the input data in accordance with stored computer-executable instructions, and generating output data. The processor(s) 212 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), and so forth.

The ad campaign generation server 202 may further include one or more I/O interfaces 218 that may facilitate the receipt of input information by the ad campaign generation server 202 from one or more I/O devices as well as the output of information from the ad campaign generation server 202 to the one or more I/O devices. The I/O devices may include, for example, one or more user interface devices that facilitate interaction between a user and the ad campaign generation server 202 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The ad campaign generation server 202 may be configured to communicate with any of a variety of other systems, platforms, networks, devices, and so forth (e.g., the ad server 204) via one or more of the network(s) 206. The ad campaign generation server 202 may include one or more network interfaces 220 that may facilitate communication between the ad campaign generation server 202 and any of the systems, networks, platforms, devices, or components of the system architecture 200.

In an illustrative configuration, the ad server 204 may include one or more processors (processor(s)) 234, one or more memory devices 236 (generically referred to herein as memory 236), additional data storage 238, one or more input/output ("I/O") interface(s) 240, and/or one or more network interface(s) 242. These various components will be described in more detail hereinafter.

The memory 236 of the ad server 204 may include volatile memory (memory that maintains its state when supplied with power) such as random access memory (RAM) and/or non-volatile memory (memory that maintains its state even when not supplied with power) such as read-only memory (ROM), flash memory, and so forth. In various implementations, the memory 236 may include multiple different types of memory, such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 236 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The memory 236 may store computer-executable instructions that are loadable and executable by the processor(s) 234, as well as data manipulated and/or generated by the processor(s) 234 during the execution of the computer-executable instructions. For example, the memory 236 may store one or more operating systems (O/S) 244; one or more database management systems (DBMS) 246; one or more program modules, applications, or the like such as, for example, one or more ad selection modules 248, one or more ad delivery modules 250, and one or more reporting modules 252.

It should be appreciated that the program modules depicted in FIG. 2 as being loaded into the memory 236 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the ad server 204 and/or hosted on remote computing device(s) accessible via one or more of the network(s) 206 may be provided to support functionality provided by the program modules depicted in FIG. 2 and/or additional or alternate functionality. Further, functionality may be modularized differently such that processing described as being supported collectively by the collection of program modules depicted in FIG. 2 as being loaded into the memory 236 may be performed by a fewer or greater number of modules, or functionality described as being supported by any particular module may be supported, at least in part, by another module. In addition, program modules that support the functionality described herein may form part of one or more applications executable across any number of systems or devices of the system architecture 200 in accordance with any suitable computing model such as, for example, a client-server model, a peer-to-peer model, and so forth.

The ad selection module(s) 248 may include computer-executable instructions that responsive to execution by one or more of the processor(s) 234 may cause operations to be performed for selecting advertisements to be served on various product detail pages. For example, the ad selection module(s) 248 may include computer-executable instructions for analyzing ad campaign data 256 associated with various ad campaigns in order to identify each matching ad campaign that is associated with a product identifier that matches a product identifier associated with a product detail page that includes an available ad slot for which an advertisement is requested. The ad selection module(s) 248 may further include computer-executable instructions for selecting a particular ad campaign having associated ad selection parameters that satisfy ad selection criteria and selecting an advertisement (e.g., advertisement 262) included in the ad campaign for presentation in the ad slot available on the product detail page (e.g., product detail page 258).

The ad delivery module(s) 250 may include computer-executable instructions that responsive to execution by one or more of the processor(s) 234 may cause operations to be performed for delivering a selected advertisement (e.g., advertisement 262) to a user device (e.g., user device 210) or a web server (not shown) for presentation in an available ad slot on a product detail page (e.g., the product detail page 258). In one or more alternative example embodiments, the selected advertisement may be transmitted to an ad exchange for ultimate presentation in the available ad slot. An impression of the selected advertisement (e.g., the advertisement 262) may be presented in association with other content on the product detail page (e.g., content 260). Functionality supported by the various program modules of the ad server 204 will be described in more detail through reference to FIGS. 3-6.

The various illustrative program modules depicted as being loaded into the memory 236 may include computer-executable instructions that in response to execution by the processor(s) 234 cause various processing to be performed. In order to perform such processing, the program modules may utilize various data/information stored in the memory 236, in the data storage 238, and/or in one or more external datastores 254. Further, while not depicted in FIG. 2, any of the data stored in external datastore(s) 254 or in the data storage 238 may be loaded into the memory 236 as well.

Referring now to other illustrative components of the ad server 204, the O/S 244 loaded into the memory 236 may provide an interface between other application software executing on the ad server 204 and the hardware resources of the ad server 204. More specifically, the O/S 244 may include a set of computer-executable instructions for managing the hardware resources of the ad server 204 and for providing common services to other application programs (e.g., managing memory allocation among various application programs). The O/S 244 may include any operating system now known or which may be developed in the future including, but not limited to, any server operating system, any mainframe operating system, or any other proprietary or non-proprietary operating system.

As previously noted, the ad server 204 may further include data storage 238 such as removable storage and/or non-removable storage including, but not limited to, magnetic storage, optical disk storage, and/or tape storage. The data storage 238 may provide non-transient storage of computer-executable instructions and other data. The data storage 238 may include storage that is internal and/or external to the ad server 204. The memory 236 and/or the data storage 238, removable and/or non-removable, are examples of computer-readable storage media (CRSM) as that term is used herein.

The DBMS 246 depicted as being loaded into the memory 236 may support functionality for accessing, retrieving, storing, and/or manipulating data stored in the external datastore(s) 254, data stored in the memory 236, and/or data stored in the data storage 238. The DBMS 246 may use any of a variety of database models (e.g., relational model, object model, etc.) and may support any of a variety of query languages. It should be appreciated that any data and/or computer-executable instructions stored in the memory 236, including any of the program modules, the O/S 244, and the DBMS 246, may be additionally, or alternatively, stored in the data storage 238 and/or in one or more of the external datastore(s) 254 and loaded into the memory 236 therefrom. The datastore(s) 254 may include any suitable data repository including, but not limited to, databases (e.g., relational, object-oriented, etc.), file systems, flat files, distributed datastores in which data is stored on more than one node of a computer network, peer-to-peer network datastores, or the like. Any of the datastore(s) 254 may represent data in one or more data schemas.

The processor(s) 234 may be configured to access the memory 236 and execute computer-executable instructions stored therein. For example, the processor(s) 234 may be configured to execute computer-executable instructions of the various program modules of the ad server 204 to cause or facilitate various operations to be performed in accordance with one or more embodiments of the disclosure. The processor(s) 234 may include any suitable processing unit capable of accepting digital data as input, processing the input data in accordance with stored computer-executable instructions, and generating output data. The processor(s) 234 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), and so forth.

The ad server 204 may further include one or more I/O interfaces 240 that may facilitate the receipt of input information by the ad server 204 from one or more I/O devices as well as the output of information from the ad server 204 to the one or more I/O devices. The I/O devices may include, for example, one or more user interface devices that facilitate interaction between a user and the ad server 204 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The ad server 204 may be configured to communicate with any of a variety of other systems, platforms, networks, devices, and so forth (e.g., the ad campaign generation server 202, the user device 210, a web server (not shown), etc.) via one or more of the network(s) 206. The ad server 204 may include one or more network interfaces 242 that may facilitate communication between the ad server 204 and any of the systems, networks, platforms, devices or components of the system architecture 200.

It should be appreciated that the ad campaign generation server 202 or the ad server 204 (or any other illustrative component of the system architecture 200) may include alternate and/or additional hardware, software, or firmware components beyond those described or depicted without departing from the scope of the disclosure. More particularly, it should be appreciated that software, firmware, or hardware components depicted as forming part of the ad campaign generation server 202 or the ad server 204 are merely illustrative and that some components may not be present or additional components may be provided in various embodiments. While various illustrative program modules have been depicted as software modules loaded into a memory, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules.

Illustrative Processes

Figure 3:
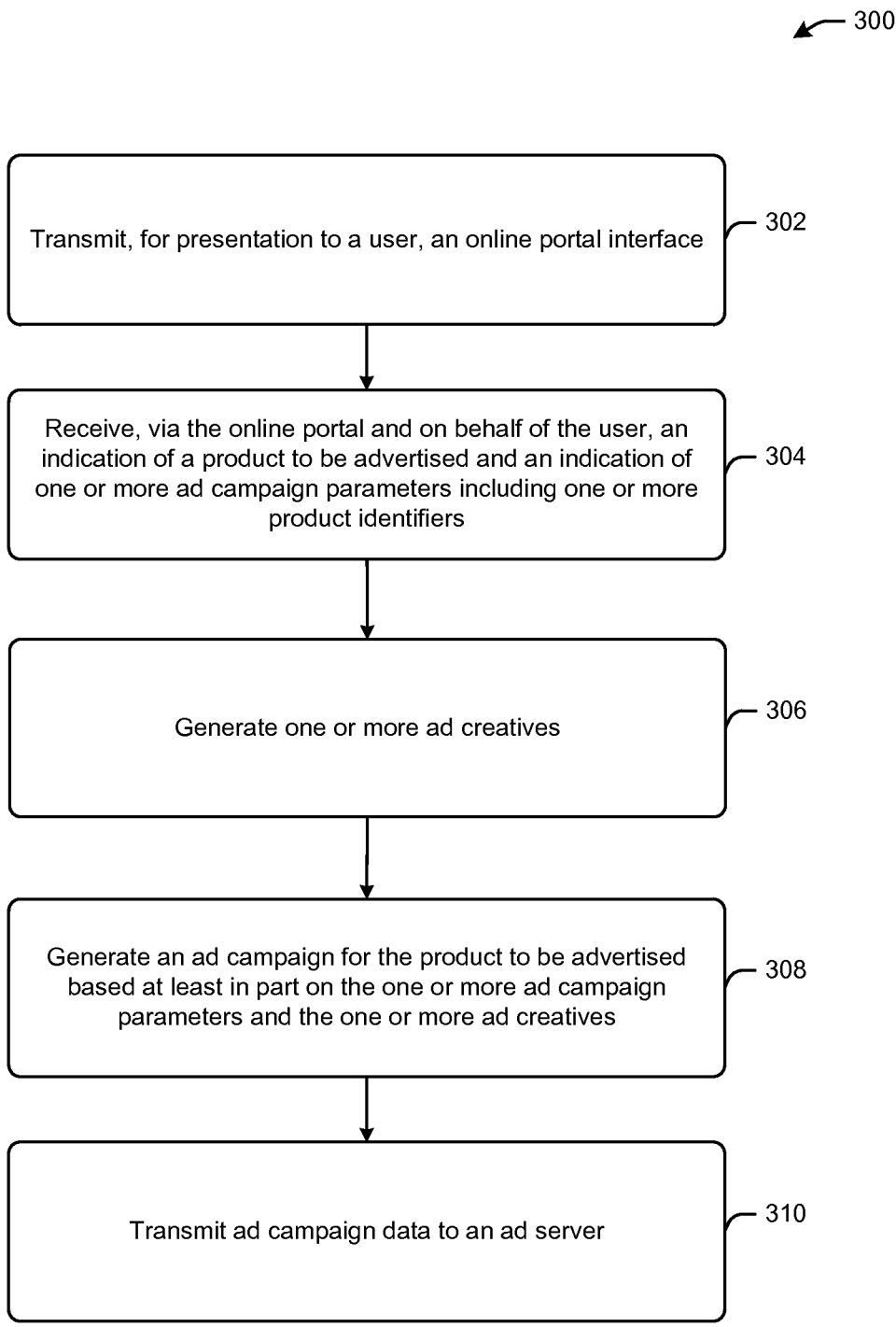
FIG. 3 is a process flow diagram of an illustrative method for generating an advertising campaign based on advertising campaign parameters in accordance with one or more embodiments of the disclosure.

FIG. 3 is a process flow diagram of an illustrative method 300 for generating an advertising campaign based on advertising campaign parameters in accordance with one or more embodiments of the disclosure. One or more operations of the method 300 may be described as being performed by the ad campaign generation server 202, or more specifically, by one or more program modules executing on the ad campaign generation server 202. It should be appreciated, however, that any of the operations of the method 300 may be performed by another device or component of the system architecture 200 such as, for example, the ad server 204. In addition, it should be appreciated that processing performed in response to execution of computer-executable instructions provided as part of an application, program module, or the like may be described herein as being performed by the application or program module itself, by a device on which the application, program module, or the like is executing, or by a system that includes such a device. While the operations of the method 300 are described in the context of the illustrative system architecture 200, it should be appreciated that the method may be implemented in connection with numerous other architectural and device level configurations.

At block 302, the ad campaign generation server 202 may transmit, for presentation to a user (e.g., the user 102 acting on behalf of an advertiser), an online portal interface (e.g., an interface associated with the online portal 108).

At block 304, the ad campaign generation server 202 may receive, via the online portal interface and on behalf of the user, an indication of a product to be advertised and an indication of one or more ad campaign parameters. The product to be advertised may be identified by an associated product identifier. The specified ad campaign parameters may include one or more product identifiers having associated product detail pages on which advertisements directed to the product to be advertised are to be presented. The ad campaign parameters may additionally include any of the example parameters previously described.

At block 306, the ad campaign generation server 202 may generate one or more ad creatives for the product. More specifically, computer-executable instructions provided as part of the ad creative generation module(s) 228 may be executed to generate the ad creatives. The ad creatives may be generated based on content provided by the user or based on standardized templates.

At block 308, the ad campaign generation server 202 may generate an ad campaign. More specifically, computer-executable instructions provided as part of the ad campaign generation module(s) 226 may be executed to generate the ad campaign based at least in part on the one or more ad campaign parameters and the one or more ad creatives. Generation of the ad campaign may include generation of ad campaign data indicative of an association between the ad campaign parameters and the ad creatives.

At block 310, the ad campaign generation server 202 may transmit the ad campaign data to an ad server (e.g., the ad server 204) for subsequent use by the ad server in selecting advertisements for presentation in available ad slots on product detail pages.

Figure 4:
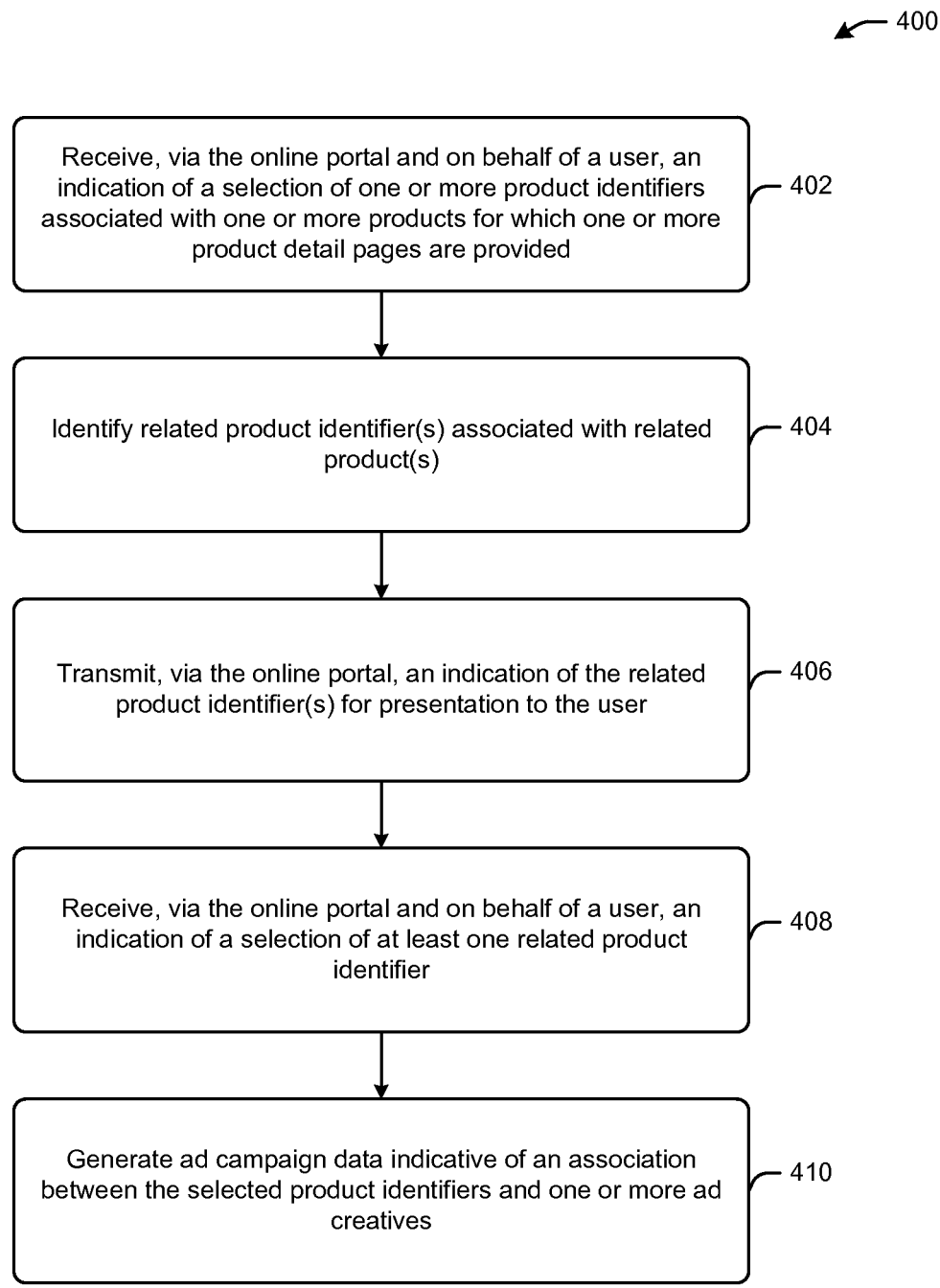
FIG. 4 is a process flow diagram of an illustrative method for identifying and recommending product identifiers that identify products that are related to products identified by user-designated product identifiers in accordance with one or more example embodiments of the disclosure.

FIG. 4 is a process flow diagram of an illustrative method 400 for identifying and recommending product identifiers that identify products that are related to products identified by user-designated product identifiers in accordance with one or more example embodiments of the disclosure. One or more operations of the method 400 may be described as being performed by the ad campaign generation server 202, or more specifically, by one or more program modules executing on the ad campaign generation server 202. It should be appreciated, however, that any of the operations of the method 400 may be performed by another device or component of the system architecture 200 such as, for example, the ad server 204. In addition, it should be appreciated that processing performed in response to execution of computer-executable instructions provided as part of an application, program module, or the like may be described herein as being performed by the application or program module itself, by a device on which the application, program module, or the like is executing, or by a system that includes such a device. While the operations of the method 400 are described in the context of the illustrative system architecture 200, it should be appreciated that the method may be implemented in connection with numerous other architectural and device level configurations.

At block 402, the ad campaign generation server 202 may receive, via the online portal and on behalf of a user, an indication of one or more product identifiers associated with one or more products for which one or more associated product detail pages are provided. The product identifier(s) received at block 402 may correspond to those received at block 304 of the method 300. The product identifier(s) may be provided as input to the recommendation module(s) 230.

At block 404, computer-executable instructions provided as part of the recommendation module(s) 230 may be executed to identify related product identifiers that are associated with products that are related to products identified by the product identifiers received at block 402. The recommendation module(s) 230 may determine that a product is related to another product if the products share one or more common attributes such as, for example, a same classification or categorization.

At block 406, the ad campaign generation server 202 may transmit, via the online portal, an indication of the related product identifiers for presentation to the user.

At block 408, the ad campaign generation server 202 may receive, via the online portal and on behalf of the user, an indication of a selection of at least one of the related product identifiers.

At block 410, computer-executable instructions provided as part of the ad campaign generation module(s) 226 may be executed to generate ad campaign data indicative of an association between the selected product identifiers and one or more ad creatives. The operation of block 410 may be performed as part of a process for generating an ad campaign for presentation of the one or more ad creatives. The selected product identifiers may include the product identifier(s) indicated at block 402 as well as the recommended product identifier(s) indicated as being selected by the user at block 408.

Figure 5:
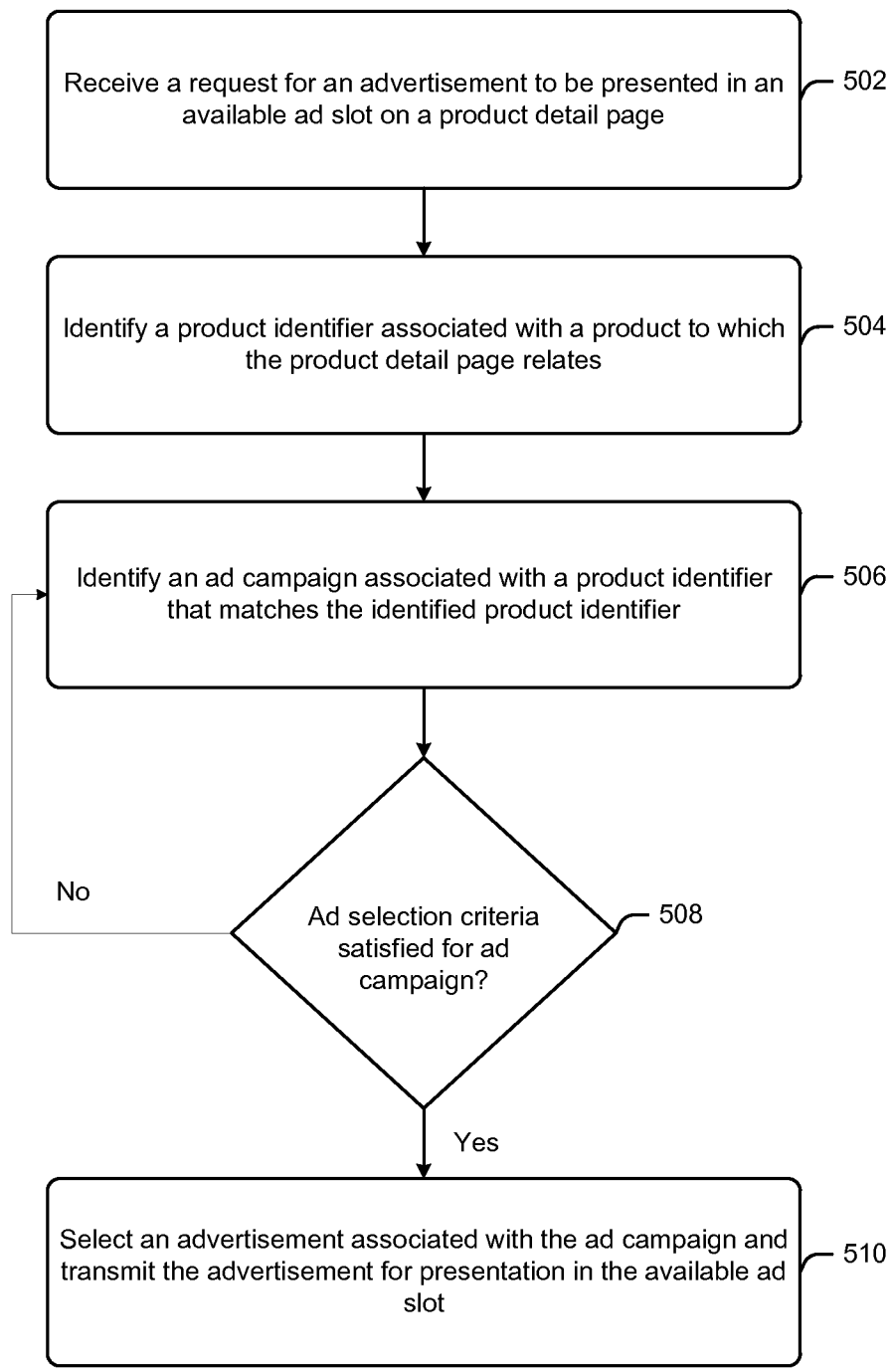
FIG. 5 is a process flow diagram of an illustrative method for receiving a request for an advertisement for presentation in an advertising slot available on a product detail page, and selecting an advertisement associated with an advertising campaign that satisfies one or more selection criteria and serving an impression thereof in accordance with one or more example embodiments of the disclosure.

FIG. 5 is a process flow diagram of an illustrative method 500 for receiving a request for an advertisement for presentation in an advertising slot available on a product detail page, and selecting and serving an impression of an advertisement associated with an advertising campaign that satisfies one or more selection criteria in accordance with one or more example embodiments of the disclosure. One or more operations of the method 500 may be described as being performed by the ad server 204, or more specifically, by one or more program modules executing on the ad server 204. It should be appreciated, however, that any of the operations of the method 500 may be performed by another device or component of the system architecture 200 such as, for example, the ad campaign generation server 202. In addition, it should be appreciated that processing performed in response to execution of computer-executable instructions provided as part of an application, program module, or the like may be described herein as being performed by the application or program module itself, by a device on which the application, program module, or the like is executing, or by a system that includes such a device. While the operations of the method 500 are described in the context of the illustrative system architecture 200, it should be appreciated that the method may be implemented in connection with numerous other architectural and device level configurations.

At block 502, the ad server 204 may receive a request for an advertisement to be presented in an available advertising slot on a product detail page. The request may be received from an application configured to render the product detail page on a user device or from a web server that hosts the product detail page. In certain example embodiments, the request may include content of the product detail page based on which a product identifier associated with a product to which the product detail page relates may be identified.

At block 504, the ad server 204 may identify a product identifier associated with a product to which the product detail page relates. An indication of the product identifier may be included in the received request.

At block 506, the ad server 204 may analyze ad campaign data to identify an ad campaign that is associated with a product identifier that matches the product identifier identified at block 504.

At block 508, the ad server 204 may determine whether ad selection parameters associated with the identified ad campaign satisfy applicable ad selection criteria. In the event of a positive determination at block 508, the ad server 204 may select an advertisement associated with the identified ad campaign and transmit the advertisement for presentation in the ad slot available on the product detail page at block 510. In the event of a negative determination at block 508, the ad server 204 may, at block 506, proceed to identify another matching ad campaign that is associated with a product identifier that matches the product identifier associated with the product to which the product detail page relates. The method 500 may then continue with the operation of block 508.

Although the operations of blocks 506 and 508 are depicted as being performed iteratively, it should be appreciated that in various example embodiments of the disclosure, multiple ad campaigns that are associated with a matching product identifier may be identified, and respective ad selection parameters associated with each of the multiple ad campaigns may be assessed against one or more thresholds and/or against one another at least partially concurrently to identify an ad campaign that satisfies the applicable ad selection criteria. It should further be appreciated that one or more operations of the method 500 may be performed responsive to the execution of computer-executable instructions provided as part of the ad selection module(s) 248 and/or the ad delivery module(s) 250.

Figure 6:
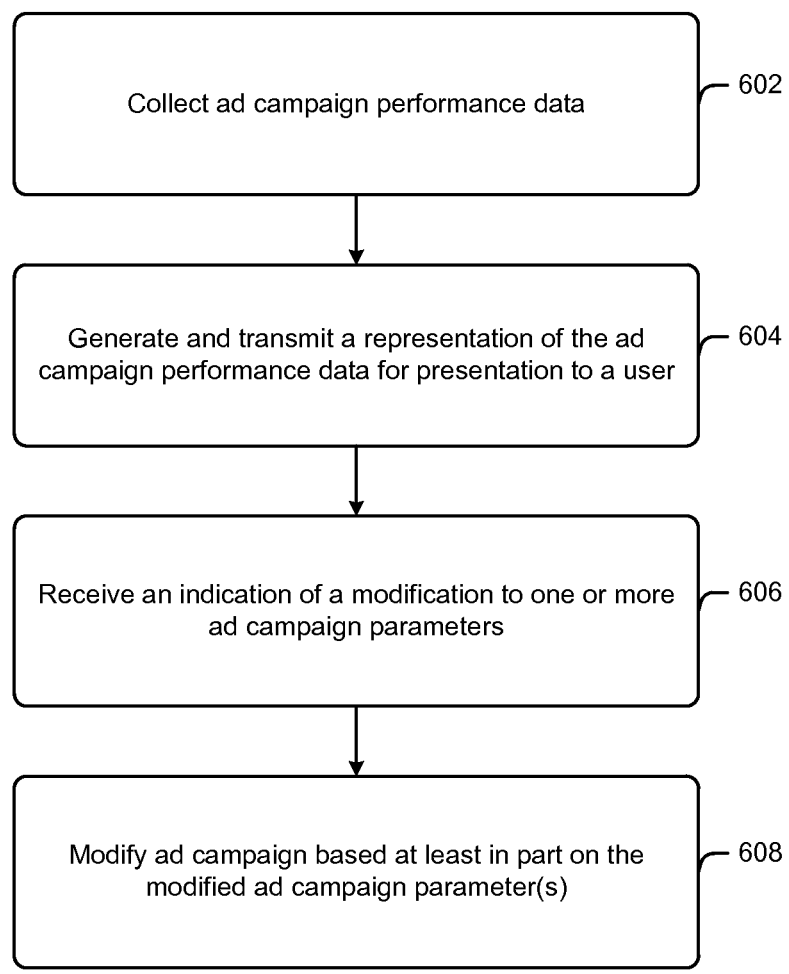
FIG. 6 is a process flow diagram of an illustrative method for collecting advertising campaign performance data, transmitting a representation of the advertising campaign performance data for presentation to a user, receiving a modification to one or more advertising campaign parameters, and modifying the advertising campaign based on the modified ad campaign parameter(s) in accordance with one or more embodiments of the disclosure.

FIG. 6 is a process flow diagram of an illustrative method 600 for collecting advertising campaign performance data, transmitting a representation of the advertising campaign performance data for presentation to a user, receiving a modification to one or more advertising campaign parameters, and modifying the advertising campaign based on the modified ad campaign parameter(s) in accordance with one or more embodiments of the disclosure. One or more operations of the method 600 may be described as being performed by the ad server 204, or more specifically, by one or more program modules executing on the ad server 204. It should be appreciated, however, that any of the operations of the method 600 may be performed by another device or component of the system architecture 200 such as, for example, the ad campaign generation server 202. In addition, it should be appreciated that processing performed in response to execution of computer-executable instructions provided as part of an application, program module, or the like may be described herein as being performed by the application or program module itself, by a device on which the application, program module, or the like is executing, or by a system that includes such a device. While the operations of the method 600 are described in the context of the illustrative system architecture 200, it should be appreciated that the method may be implemented in connection with numerous other architectural and device level configurations.

At block 602, computer-executable instructions provided as part of the reporting module(s) 252 may be executed to collect ad campaign performance data associated with an ad campaign.

At block 604, computer-executable instructions provided as part of the reporting module(s) 252 may be executed to generate and transmit a representation of the ad campaign performance data for presentation to the user. In certain example embodiments, the ad campaign performance data may be transmitted to the ad campaign generation server 202 for presentation to a user (e.g., the user 102) via the online portal 108.

At block 606, an indication of a modification to one or more ad campaign parameters may be received. The indication may be received by the ad campaign generation server 202 via the online portal 108. In certain example embodiments, a user may assess the ad campaign performance data to identify poorly performing product detail pages and may choose to disassociate product identifiers associated with such poorly performing product detail pages from an ad campaign. In other example embodiments, a user may modify one or more ad campaign parameters in an attempt to enhance the performance of the ad campaign in connection with a poorly performing product identifier.

At block 608, the ad campaign may be modified based on the modified ad campaign parameters. For example, the product identifiers indicated at block 606 may be disassociated from the ad campaign at block 608. In certain other example embodiments, the ad campaign generation server 202 (e.g., the recommendation module(s) 230) may independently analyze the ad campaign performance data and identify one or more ad campaign parameters to be modified.

Although the operations of blocks 602-604 are described as being performed by the ad server 204 and the operations of blocks 606-608 are described as being performed by the ad campaign generation server 202, it should be appreciated that any of the operations of the method 600 may be performed by the ad campaign generation server 202, the ad server 204, or any other suitable component of the system architecture 200. Further, it should be appreciated that in various example embodiments of the disclosure, the ad campaign generation server 202 and the ad server 204 may be hosted or controlled by a same entity or related entities.

The operations described and depicted in the illustrative methods of FIGS. 3-6 may be carried out or performed in any suitable order as desired in various embodiments of the disclosure. Additionally, in certain embodiments, at least a portion of the operations may be carried out in parallel. Furthermore, in certain embodiments, less, more, or different operations than those depicted in FIGS. 3-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers), data storage (e.g., file management) routines, other common routines and services, etc.), or third-party software components (e.g., middleware, encryption or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
   receiving, over at least one network comprising a wireless network portion and by an advertising targeting system comprising one or more computer processors, from a system hosting an interface associated with a browser application executing on a user device, a request received by the system, wherein the request is associated with an available advertising slot on a product detail page rendered by the browser application;
   identifying, by the advertising targeting system, a first product identifier associated with a first product to which the product detail page relates;
   identifying, by the advertising targeting system, a plurality of advertising campaigns received from the system, wherein the plurality of advertising campaigns are associated with a second product identifier that matches the first product identifier, wherein the plurality of advertising campaigns comprise a first advertising campaign associated with first selection parameters, and a second advertising campaign associated with second selection parameters;
   determining, by the advertising targeting system, that the second selection parameters fail to satisfy a first threshold associated with a first advertising selection criteria;
   determining, by the advertising targeting system, that the second advertising campaign is to be excluded from consideration based at least in part on the failure of the second selection parameters to satisfy the first threshold associated with the first advertising selection criteria;
   comparing, by the advertising targeting system, the first selection parameters to a second threshold associated with a second advertising selection criteria, and the second selection parameters to a third threshold associated with a third advertising selection criteria;
   determining, by the advertising targeting system and based at least in part on the comparing, metrics associated with the first selection parameters, wherein the metrics indicate that the first selection parameters satisfy the second threshold and fail to satisfy the third threshold;
   selecting, by the advertising targeting system, an advertisement associated with the first advertising campaign, for a second product having one or more attributes in common with the first product, responsive to the metrics; and
   transmitting, over the at least one network, by the advertising targeting system to the user device, computer-executable code in association with the advertisement, wherein execution of the computer-executable code causes the browser application to perform at least one of: (i) redirect to a second web page associated with the product detail page, or (ii) include the second product in an online shopping cart.

2. The method of claim 1, wherein the selected advertisement advertises the second product having one or more attributes in common with the first product.

3. The method of claim 2, wherein each of the first product and the second product comprise respective consumable content, and wherein the one or more attributes comprise at least one of:
   (i) a product category,
   (ii) a product manufacturer, or
   (iii) a product author.

4. The method of claim 1, wherein the first selection parameters comprise at least one of:
   (i) a bid amount specified by an advertiser associated with the first advertising campaign,
   (ii) one or more performance metrics associated with the first advertising campaign,
   (iii) a frequency metric indicative of a number of times the selected advertisement has been presented to a user of the user device, or
   (iv) a relatedness metric indicative of a measure of correspondence between a product advertised by the first advertising campaign and the product to which the product detail page relates.

5. The method of claim 1, wherein the method further comprises:
identifying, by the advertising targeting system, a third advertising campaign associated with a third product identifier that matches the first product identifier, wherein the third advertising campaign comprises a third set of one or more advertisements; and
determining, by the advertising targeting system, that one or more selection parameters associated with the third advertising campaign fail to satisfy the first threshold, wherein the first advertising campaign is identified responsive at least in part to determining that the one or more selection parameters associated with the third advertising campaign fail to satisfy the first threshold.

6. The method of claim 1, further comprising:
collecting, by the advertising targeting system, performance data associated with the first advertising campaign;
generating, by the advertising targeting system, a representation of the performance data; and
transmitting, by the advertising targeting system, the representation of the performance data for presentation to an entity associated with the first advertising campaign.

7. A system, comprising:
at least one memory storing computer-executable instructions; and
at least one processor configured to access the at least one memory and to execute the computer-executable instructions to:
receive, over at least one network comprising a wireless network portion and from a first system hosting an interface associated with a browser application executing on a user device, a request received by the first system, wherein the request is associated with an available advertising slot on a product detail page rendered by the browser application on the user device;
identify a first product identifier associated with a first product to which the product detail page relates;
identify a plurality of advertising campaigns received from the first system, wherein the plurality of advertising campaigns are associated with the first product identifier, wherein the plurality of advertising campaigns are associated with a second product identifier that matches the first product identifier, wherein the plurality of advertising campaigns comprise a first advertising campaign associated with first selection parameters, and a second advertising campaign associated with second selection parameters;
determine that the second selection parameters fail to satisfy a first threshold associated with a first advertising selection criteria;
determining that the second advertising campaign is to be excluded from consideration based at least in part on the failure of the second selection parameters to satisfy the first threshold associated with the first advertising selection criteria;
comparing the first selection parameters to a second threshold associated with a second advertising criteria and to a third threshold associated with a third advertising criteria;
determining, based at least in part on the comparing, metrics associated with the first selection parameters, wherein the metrics indicate that the first selection parameters satisfy the second threshold and fail to satisfy the third threshold;
select an advertisement associated with the first advertising campaign, for a second product having one or more attributes in common with the first product, responsive to the metrics; and
transmit, over the at least one network to the user device, computer-executable code in association with the advertisement, wherein execution of the computer-executable code causes the browser application to perform at least one of: (i) redirect to a second web page associated with the product detail page, or (ii) include the second product in an online shopping cart.

8. The system of claim 7, wherein the selected advertisement advertises the second product having one or more attributes in common with the first product.

9. The system of claim 7, wherein the first advertising campaign is identified based at least in part on advertising campaign data that comprises data indicating an association between the first product identifier and a set of one or more advertisements that are associated with the first advertising campaign.

10. The system of claim 7, wherein the first selection parameters comprise at least one of:
(i) a bid amount specified by an advertiser associated with the first advertising campaign,
(ii) one or more performance metrics associated with the first advertising campaign,
(iii) a frequency metric indicative of a number of times the selected advertisement has been presented to a user of the user device, or
(iv) a relatedness metric indicative of a measure of correspondence between a first product advertised by the first advertising campaign and the first product to which the product detail page relates.

11. The system of claim 7, wherein prior to identification of the first advertising campaign, the at least one processor is further configured to execute the computer-executable instructions to:
identify a third advertising campaign associated with the first product identifier, wherein the third advertising campaign comprises a third set of one or more advertisements; and
determine that one or more selection parameters associated with the third advertising campaign fail to satisfy the first threshold,
wherein the first advertising campaign is identified responsive at least in part to determining that the one or more selection parameters associated with the third advertising campaign fail to satisfy the first threshold.

12. The system of claim 11, wherein the one or more selection parameters associated with the third advertising campaign comprise a conversion performance metric indicative of a number or percentage of user conversions associated with the third advertisement campaign, and wherein the at least one processor is configured to determine that the conversion performance metric fails to satisfy the first threshold.

13. A device comprising memory and processing circuitry configured to:
receive, from a system hosting an interface associated with a browser application executing on a user device, a request received by the system, wherein the request is associated with an available advertising slot on a product detail page rendered by the browser application;
identify a first product identifier associated with a first product to which the product detail page relates;

identify a plurality of advertising campaigns received from the system, wherein the plurality of advertising campaigns are associated with a second product identifier that matches the first product identifier, wherein the plurality of advertising campaigns comprise a first advertising campaign associated with first selection parameters, and a second advertising campaign associated with second selection parameters;

determine that the second selection parameters fail to satisfy a first threshold associated with a first advertising selection criteria;

determine that the second advertising campaign is to be excluded from consideration based at least in part on the failure of the second selection parameters to satisfy the first threshold associated with the first advertising selection criteria;

compare the first selection parameters to a second threshold associated with a second advertising criteria and to a third threshold associated with a third advertising criteria;

determine, based at least in part on the comparison, metrics associated with the first selection parameters, wherein the metrics indicate that the first selection parameters satisfy the second threshold, and that the first selection parameters fail to satisfy the third threshold;

select an advertisement associated with the first advertising campaign, for a second product having one or more attributes in common with the first product, responsive to the metrics; and transmit, over at least one network and to the user device, computer-executable code in association with the advertisement, wherein execution of the computer-executable code causes the browser application to perform at least one of: (i) redirect to a second web page associated with the product detail page, or (ii) include the second product in an online shopping cart.

14. The device of claim 13, wherein the selected advertisement advertises the second product having one or more attributes in common with the first product.

15. The device of claim 13, wherein each of the first product and the second product comprise respective consumable content, and wherein the one or more attributes comprise at least one of:
(i) a product category,
(ii) a product manufacturer, or
(iii) a product author.

16. The device of claim 13, wherein the first selection parameters comprise at least one of:
(i) a bid amount specified by an advertiser associated with the first advertising campaign,
(ii) one or more performance metrics associated with the first advertising campaign,
(iii) a frequency metric indicative of a number of times the selected advertisement has been presented to a user of the user device, or
(iv) a relatedness metric indicative of a measure of correspondence between a product advertised by the first advertising campaign and the product to which the product detail page relates.

17. The device of claim 13, wherein the memory and processing circuitry are further configured to:
identify a third advertising campaign associated with a third product identifier that matches the first product identifier, wherein the third advertising campaign comprises a third set of one or more advertisements; and
determine that one or more selection parameters associated with the third advertising campaign fail to satisfy the first threshold,
wherein the first advertising campaign is identified responsive at least in part to determining that the one or more selection parameters associated with the third advertising campaign fail to satisfy the first threshold.

18. The device of claim 13, wherein the memory and processing circuitry are further configured to:
collect performance data associated with the first advertising campaign;
generate a representation of the performance data; and
transmit the representation of the performance data for presentation to an entity associated with the first advertising campaign.

\* \* \* \* \*